United States Patent [19]

Murley, Jr. et al.

[11] 4,009,937
[45] Mar. 1, 1977

[54] MULTIPLEX ADDRESSING OF COLLOIDAL LIGHT VALVES

[75] Inventors: Ellsworth M. Murley, Jr.; Allen Davis, both of Toledo, Ohio

[73] Assignee: Owens-Illinois, Inc., Toledo, Ohio

[22] Filed: Sept. 8, 1975

[21] Appl. No.: 611,032

[52] U.S. Cl. .................. 350/160 R; 204/195 S
[51] Int. Cl.² ................................ G02F 3/16
[58] Field of Search ........ 350/160 R, 160 LC, 267; 340/324 M, 166 EL

[56] References Cited

UNITED STATES PATENTS

| | | | |
|---|---|---|---|
| 3,527,525 | 9/1970 | Marks | 350/267 |
| 3,809,458 | 5/1974 | Heuner | 340/166 EL |

OTHER PUBLICATIONS

Taylor et al., Optics Communications, vol. 8, No., Aug. 1973, pp. 426–429.

Primary Examiner—Robert J. Webster
Attorney, Agent, or Firm—Steve M. McLary; E. J. Holler

[57] ABSTRACT

A system for the multiplex addressing of a colloidal light valve array. An array of individual sites or cells is made using a colloidal light valve (CLV) material which has a light transmission curve that is a function of the frequency of the applied potential across the site or cell. The array is generally defined by rows and columns of electrical conductors. The intersections of the rows and column define sites or are at individual cells. Any one site may be uniquely addressed by supplying this site with a high frequency electrical signal and a low frequency electrical signal during one time period and with two low frequency electrical signals during a second time period. Non-selected or non-addressed sites are supplied with combinations of high frequency and low frequency electrical signals during the two time periods to force the average light transmission valve of these nonselected sites to be the compliment of the average light transmission of the addressed site.

8 Claims, 17 Drawing Figures

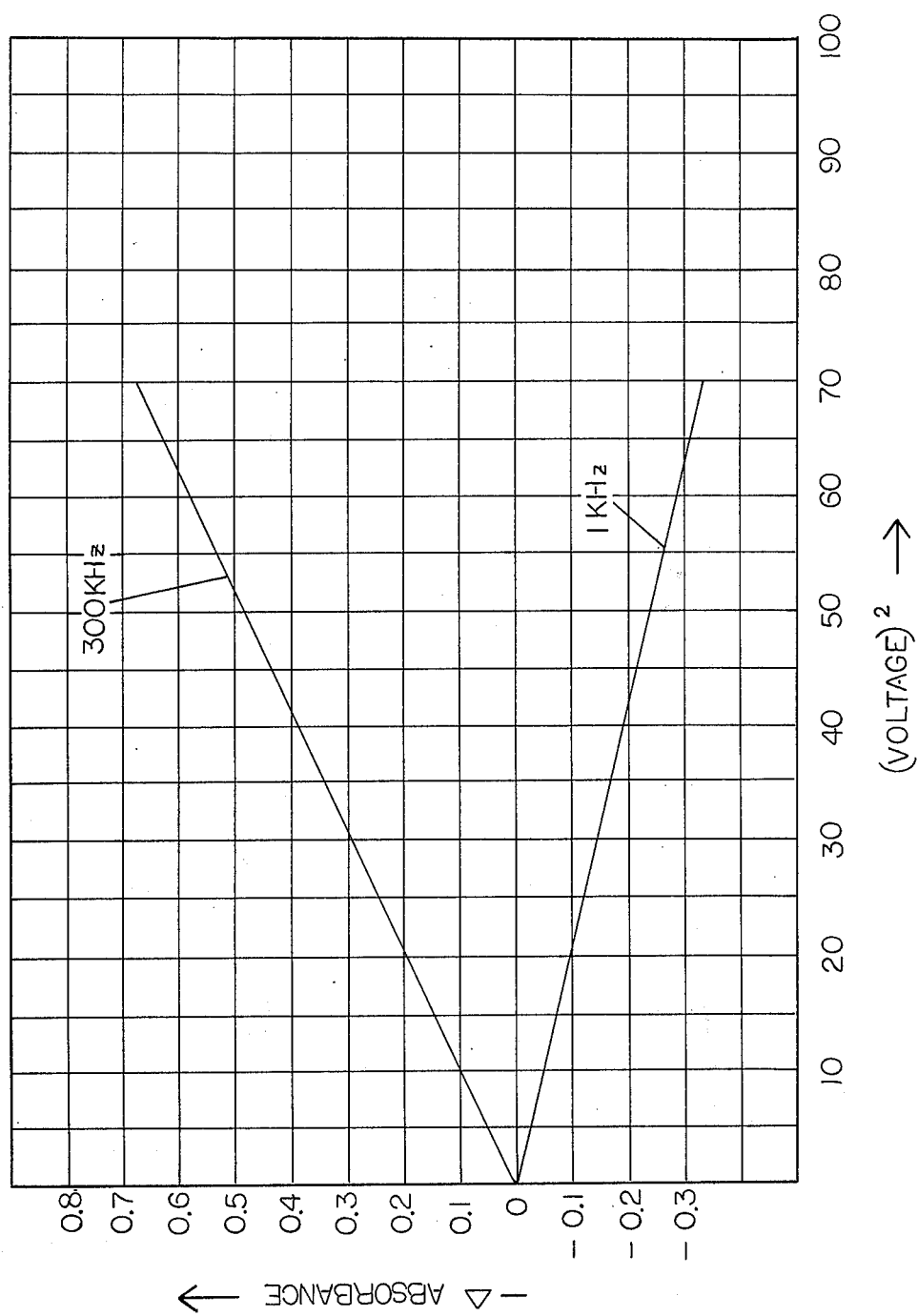

1

MULTIPLEX ADDRESSING OF COLLOIDAL LIGHT VALVES

BACKGROUND OF THE INVENTION

The invention generally relates to colloidal light valves. More particularly, this invention relates to colloidal light valve material which has frequency dependent light transmission characteristics. Specifically, this invention relates to a system for multiplex addressing an array made up of colloidal light valves exhibiting this frequency dependent trait.

Colloidal light valve (CLV) materials per se have been known for many years. See, for example, U.S. Pat. Nos. 1,955,923 and 1,963,496. However, their usefulness in displays has been limited because they were not particularly suited to multiplex addressing. This was so because CLV materials did not exhibit a sharp voltage or frequency threshold as did for example, liquid crystals. We have developed at least two CLV materials which exhibit sharp frequency thresholds and have successful made arrays, using these materials, which can be multiplex addressed. The operation of these CLV materials is therefore a function of both the potential difference across a cell fitted with such material and the frequency of the applied signal.

The following prior art references are considered to be pertinent:

A. M. Marks, "Electrooptical Characteristics of Dipole Suspensions", *Applied Optics*, vol. 8, pp. 1397–1414, July, 1969.

A. M. Marks, "Electrooptical Properties of Dipole Fluids and Their Applications to Displays", Publication of Marks Polarized Corporation, Whitestone, New York.

E. Gordon and L. Anderson, "New Display Technologies—An Editorial Viewpoint", *Proceedings of the IEEE*, Vol. 61, No. 7, pp. 807–813, July, 1973.

L. A. Goodman, "Liquid Crystal Displays Electro-Optic Effects and Addressing Techniques", *RCA Review*, Vol. 35, No. 4, pp. 613–651, December, 1974.

C. Stein and R. Kashonow, "A Two-Frequency Coincidence Addressing Scheme for Nematic-Liquid-Crystal Displays", *Applied Physics Letters*, Vol. 19, No. 9, pp. 343–345, November, 1971.

S. P. Stoylov, "Colloid Electro-Optics-Electrically Induced Optical Phenomena in Disperse Systems", *Advances in Colloid and Interface Science*, No. 3, pp. 45–110, 1971.

P. Wild and J. Nehring, "Turn-On Time Reduction and Contrast Enhancement in Matrix Addressed Liquid-Crystal Light Valves", *Applied Physics Letters*, Vol. 19, No. 9, pp. 335–336, November, 1971.

U.S. Pat. Nos. 3,841,732; 3,512,876; 3,773,684; 3,885,861; 3,878,537; and 3,895,373.

SUMMARY OF THE INVENTION

Our invention resides in a system, and a method for operating the system, for addressing a matrix of dimensions M×N wherein the matrix is made of a colloidal light valve material which is frequency responsive to exhibit greater light transmission in response to high frequency electrical signals than to low frequency electrical signals. The method of operation includes defining a plurality of unique sites in a matrix of dimensions M×N, each site being made of said colloidal light valve material. Each matrix site in each M row is connected in series to a single electrical input conductor to give a total of M row input conductors. Each matrix site in each N column is connected in series to a single input electrical conductor to thereby give a total of N column input conductors. Any selected $M_i$, $N_j$ one of said matrix sites may be multiplex addressed. The addressing includes individually supplying one of the $M_i$ row and $N_j$ column electrical conductors with a high frequency electrical signal and the other of said $M_i$ row and $N_j$ column electrical conductors with a low frequency electrical signal during one time period and supplying both $M_i$ row and $N_j$ columns electrical conductors with a low frequency electrical signal during another time period in a repeating cycle. At the same time, the non-selected sites are supplied with combinations of high frequency and low frequency electrical signals during said two time periods to force the average light transmission of said non-selected sites to be the compliment of the average light transmission of said $M_i$, $N_j$ selected site.

BRIEF DESCRIPTION OF THE DRAWINGS

$-\left(\dfrac{\Delta A}{A_{E=0}}\right)$ 10 volts for both the two level and three level type CLV materials; and FIG. 17 is a plot of voltage squared vs. absorbance change for two frequencies of applied signal for the three level type CLV material.

DETAILED DESCRIPTION OF THE DRAWINGS

Figure 1:
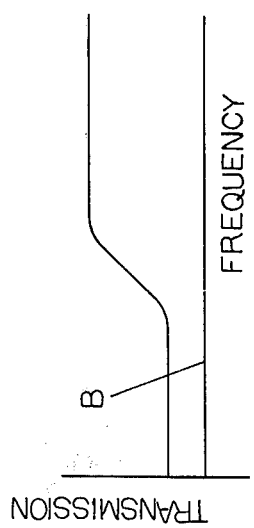
FIG. 1 is a graph of light transmission vs. frequency of applied signal for one form of colloidal light valve material.

FIG. 1 illustrates a chart of frequency of applied signal versus transmission for a particular type of colloidal light valve (hereinafter referred to as CLV). As may be seen, this particular type of CLV exhibits a frequency dependent phenomenon in which its transmission is less at lower frequencies and has a transition with the transmission of light becoming greater at higher frequencies. This is a two level type material. The base line designated as B is that transmission value that is present when no signal is applied. Typically, CLV's are dark when they are off and the base line thus indicates a dark condition. A material which demonstrates such a frequency dependent transmission curve should be amenable to multiplexed type addressing when arranged in a matrix array. However, since the "on" or light condition requires a high frequency signal to be present, there are problems in addressing a single matrix location because the high frequency signal will cause all of those matrix sites along the line to which it is applied to become transparent, or more properly, more light transmissive. That is, while a low frequency signal might be applied to this matrix site in an attempt to maintain it in the less transmissive state, the high frequency signal will tend to overcome the low frequency component and raise that particular site to the higher transmission value as shown in FIG. 1. Therefore, in order to multiplex address a matrix of colloidal light valves made of the material exhibiting the characteristics shown in FIG. 1, one possibility is to assume that the informational bit is actually carried by a site which is in the state that is generally considered to be "off". In order to do this, it is necessary that the background of the display be made transparent or at least light colored and the CLV material should be confined to segmented cavities. In this situation, a low frequency signal is applied to a particular cavity or site. This will then cause this particular site to become less transmissive than those sites which are receiving high frequency signals. Thus, the matrix site which is addressed will appear relatively darker than the surrounding area. This particular type of configuration will be further explained with respect to FIGS. 3 and 4. Yet another possibility is further explained with respect to a configuration described as mode two, as later explained herein.

Figure 2:
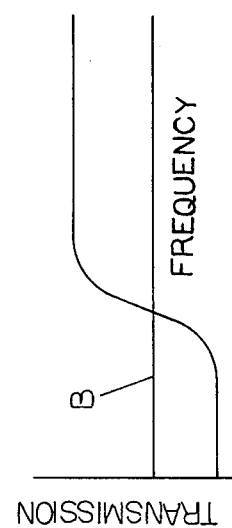
FIG. 2 is a graph of light transmission vs. frequency of applied signal for a second form of colloidal light valve material.

FIG. 2 illustrates yet another transmission versus frequency curve for another type of CLV material. In this case, the characteristics are such that when a low frequency signal is applied, the transmission of the CLV material actually falls below that level indicated by the base line B. That is, when a low frequency signal is applied, the material actually becomes darker than it is in its normal, unexcited state. This is a three level type material. This particular type of material then lends itself to multiplex type addressing of sites in an open cell type configuration, since a particular site may be unambiguously addressed by a low frequency voltage signal. Both the material of FIG. 1 and FIG. 2 do lend themselves to multiplex addressing and the discussion of multiplex addressing which will be made herein should be construed as being applicable to either type of material, keeping in mind the particular requirements for high frequency versus low frequency addressing and cell construction that are required by the characteristics of the two materials.

Figure 4:
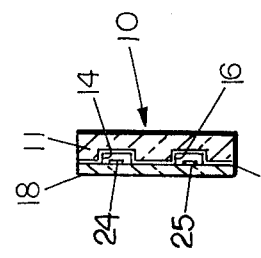
FIG. 4 is a cross-sectional view taken along the line 4—4 of FIG. 3.
Figure 3:
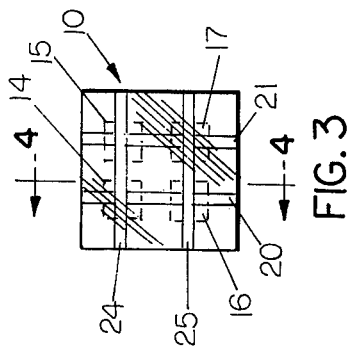
FIG. 3 is a top, plan view of a closed cell type matrix of the present invention.

FIGS. 3 and 4 illustrate a CLV display 10 of one type which could be constructed for use with the material whose characteristic curve is illustrated in FIG. 1. A non-conductive substrate material, such as a glass plate 11, may have formed in it separate depressions or cells 14 through 17 containing colloidal light valve materials which illustrate the characteristics shown in FIG. 1. The cells 14 through 17 are covered with a cover plate 18 of a transparent non-conductive material such as glass. Thus, individual isolated cells are defined. The display 10 illustrated in FIGS. 3 and 4 is a simple 2 × 2 matrix, but it is quite evident to those skilled in the art that if a 2 × 2 matrix can be demonstrated as successfully multiplexable, a matrix of any dimension desired may be multiplexed using the same basic theory. All that is required for multiplex addressing is the ability to unambiguously address any one of the sites or cells at will. The addressing signal to the columns is carried on two coductive films or electrodes 20 and 21 which may be formed on the glass plate 11 of a material such as tin oxide. In a similar manner, the rows are addressed through two similarly deposited films or electrodes 24 and 25 on the side of the plate 18 facing the cells 14–17. The condition of any individual cell is a function of the potential difference across the electrodes associated with that cell. The cells do not have a ground reference. The side view of FIG. 4 is included simply to illustrate the fact that the cells 14 through 17 are completely separated from one another and thus may be completely immune from any possible cross talk to allow one of the cells at a time to be turned on. The thickness of the electrodes 20, 21, 24 and 25 is grossly exaggerated in FIGS. 3 and 4. These are actually quite thin, with the plate 11 and cover plate 18 being joined together by epoxy or similar material.

Figure 6:
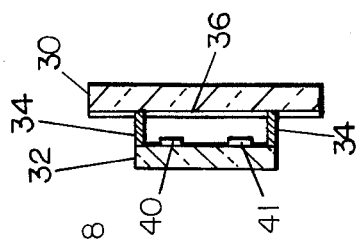
FIG. 6 is a cross-sectional view taken along the line 6—6 of FIG. 5.
Figure 5:
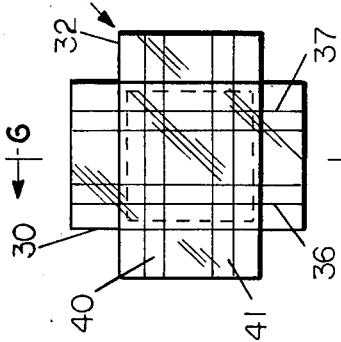
FIG. 5 is a top plan view of an open cell type matrix of the present invention.

FIGS. 5 and 6 illustrate an open cell type display 28. In this particular type of arrangement, there is provided a lower non-conductive substrate such as a lower glass plate 30 and an upper non-conductive substrate such as an upper glass plate 32. As seen in FIG. 6, the lower plate 30 and upper plate 32 are spaced apart and the edges between them may be sealed with a material such as glass solder 34. The space so formed may then be filled with a colloidal light valve type material of the type described with respect to FIG. 2. The upper surface of the lower plate 30 may include two spaced apart, generally parallel conductive strips or electrodes 36 and 37 which may be made of tin oxide. The upper glass plate 32 has formed on its lower surface, facing the lower glass plate 30, two similar parallel, spaced apart conductive strips or electrodes 40 and 41 which also may be formed of a material such as tin oxide. The thickness of these electrodes is much exaggerated as in FIGS. 3 and 4. The net result is that the strips 36, 37 and 40 and 41 intersect at right angles to one another at four different sites. It is these sites which are addressable by multiplexing techniques if the colloidal light valve material is a material such as that shown in FIG.

2. The sites do not have any ground reference, so the condition of any site is a function of the potential across the electrodes whose intersection define that site. Again keep in mind that the example of multiplex addressing which will be given with respect to FIG. 7 may be used with either the display 28 of the open-cell type or of the discrete cell type 10, as shown in FIGS. 3 and 4.

Figure 7:
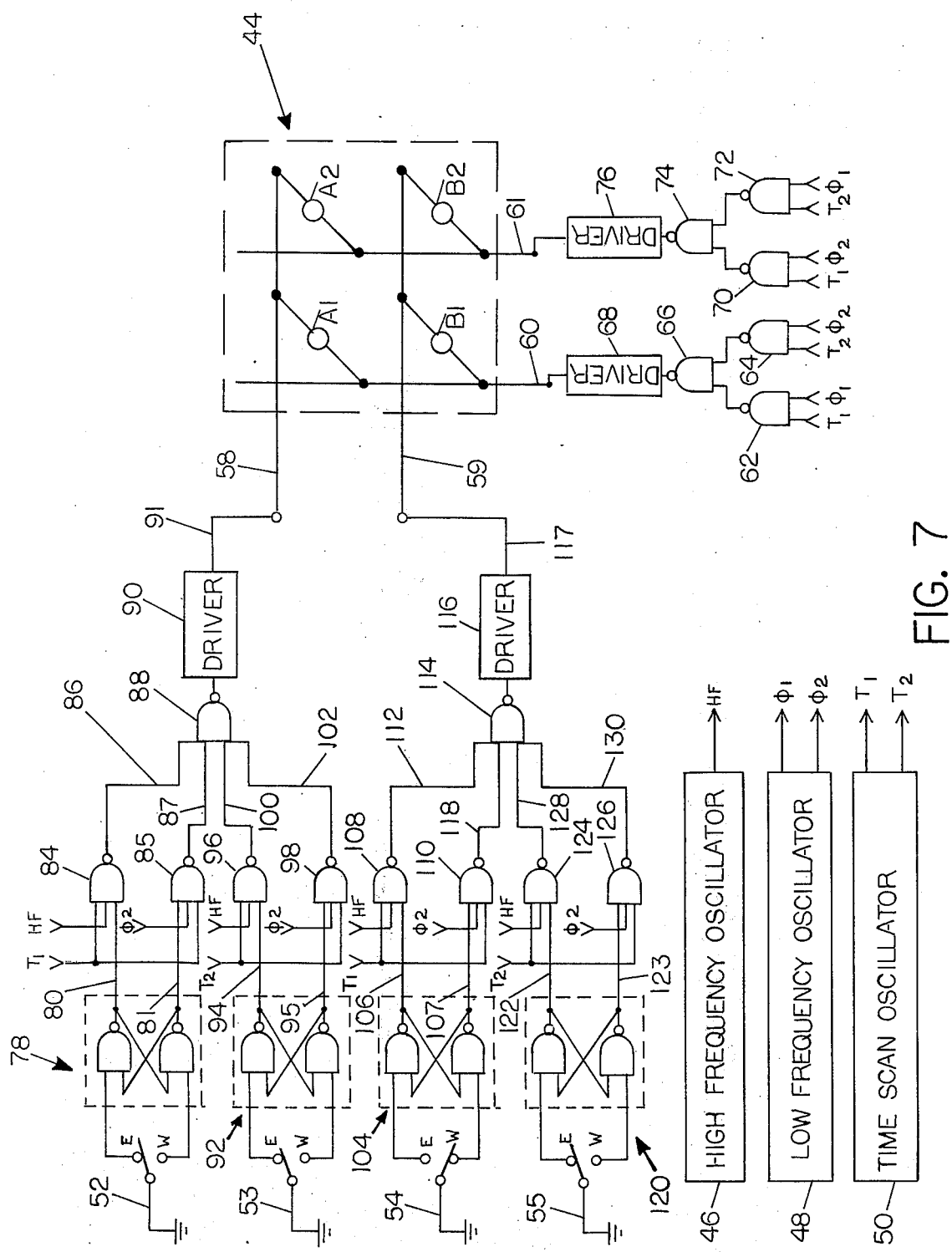
FIG. 7 is a block diagram of the multiplex addressing circuit, and a matrix so addressed, of the present invention.

FIG. 7 illustrates a 2 × 2 matrix 44 which is made up of four separate colloidal light valves, A1, A2, B1, and B2. The cells A1 and A2 define one row while the cells B1 and B2 define a second row. The cells B1 and A1 define one column while the cells B2 and A2 define a second column. The purpose behind the circuit shown in FIG. 7 is to allow multiplex addressing of any one of these cells without disturbing the state of any one of the other cells. The specific addressing circuit which will now be described in detail is simply by way of example of one possible means of multiplex addressing and it should be apparent to those skilled in the art that other types of multiplex addressing systems could also be used. In particular, the use of manual switches to determine whether a particular cell is in the erase mode or write mode would be done in an operational system by an electronic switching means which would furnish the informational bits as they were received. In addition, the specific matrix 44 shown in FIG. 7 is assumed to be of the open cell type that was described with respect to FIG. 5 and utilizes the material whose characteristic curve was shown in FIG. 2. However, to use this same system with the material whose characteristics curve was shown in FIG. 1 and to use an isolated cell type display as shown in FIG. 3 would be obvious. The multiplex addressing system includes a high frequency oscillator 46 which generates a square wave signal in the range of 200 kilohertz having a zero to V voltage range. The output of the high frequency oscillator 46 is designated as HF and to simplify the number of wiring connections in FIG. 7, conventional electronic drawing techniques are used, in that the output of the high frequency oscillator 46 is shown as an outgoing arrow with an HF and any inputs of this high frequency signal are shown as an incoming arrow with the HF designation beside them. This convention is used for all connections within this particular circuit diagram. The multiplexing means also includes a low frequency oscillator 48 which generates an output signal in the 1 kilohertz range having a zero to V voltage range. There are actually two outputs of the low frequency signal designated as $\phi 1$ and $\phi 2$. The $\phi 1$ and $\phi 2$ signals are of a generally square wave type and are so chosen to be 180° out of phase with one another. Also provided is a time scan oscillator 50 which presents two output signals designated as T1 and T2 for the purpose of scanning the entire matrix 44 on a regular basis. The frequency of oscillation of the time scan oscillator 50 may be chosen to be in the 30 to 100 hertz range. A higher scanning rate would not necessarily degrade the performance of this system, but should be chosen to generally be compatible with the response time of any material which is used to form the cells of the matrix 44. Four grounded mode control switches 52, 53, 54 and 55 are used to control the state of the four individual cells in the matrix 44. The switch 52 controls the state of the cell A1, the switch 53 controls the state of the cell A2, the switch 54 controls the state of the cell B1, and the switch 55 controls the state of the cell B2. The switches 52 through 55 are two position switches and their two terminals are designated as E and W for each one, the E standing for erase or "off" and the W standing for write or "on". There are therefore only two conditions available for these cells; "on" or "off". The matrix 44 is constructed using two row conductors 58 and 59 and two column conductors 60 and 61. The cells which make up the matrix 44 are connected such that one side of each cell is connected to a row conductor and the opposite side of the cell is connected to a column conductor. That is, the cell A1 is connected to the conductors 58 and 60 as an example. The basic logic conditions for the operation of the matrix 44 in a multiplex mode may be generally stated as follows: When it is desired to erase or keep any one of the cells in a non-informational mode, the high frequency signal supplied by the high frequency oscillator 46 is applied to at least one of the row or column conductors connected to that particular cell. As has been previously noted in a situation where a high frequency signal is present, the high frequency signal will blank or overcome any low frequency signals that may be presented simultaneously therewith and will therefore dominate. As was noted with the material whose characteristic curve was illustrated in FIG. 2 the high frequency signal will cause this particular cell to become relatively lighter than its background. Conversely, when it is desired to write or furnish a particular cell with an informational signal, low frequency signals are applied to both the row and the column conductor which are connected to this cell. These cells operate on a potential difference so that one of these signals should be that designated as $\phi 1$ and the other should be that designated as $\phi 2$. This then gives the necessary potential difference across the cell to allow this cell to become relatively darker than its background. Under this particular set of circumstances, it will be necessary that the high frequency signal be eliminated completely from both the row and the column conductors in which both the cell to be addressed and its adjacent cells are connected. This could present a problem since, as was noted, it is the presence of the high frequency signal which blanks or erases the other cells. For example, if only cell B1 were to be addressed, the conductor 59 would have a low frequency signal presented to it as would conductor 60. This then means that the cell B2 would also be receiving a low frequency signal presented on the conductor 59. In order to properly blank the other cells which use this common line, the same low frequency signal is presented to the opposed conductors of the cells which it is desired to maintain in an "off" or erase mode. In this case then the same low frequency signal, in phase, would be presented to the opposed conductors of the cell B2 so that the potential difference across the cell B2 would not be sufficient to change its state. This will be explained more fully as the precise configuration used in the multiplexing arrangement is described.

The input signal format to the column conductors 60 and 61 is the most readily understood and will be discussed first. The timing signal T1 and the low frequency signal $\phi 1$ are both presented to a NAND gate 62. A second NAND gate 64 for supplying the column conductor 60 has furnished to its input terminals the timing signal T2 and the low frequency signal $\phi 2$. The output of the NAND gates 62 and 64 are both presented to inputs of a third NAND gate 66. The output of the NAND gate 66 then is processed through a driver 68 which actually furnishes the operating signal of about 20 volts peak to the column conductor 60. It may be seen therefore that during the time period T1, the low frequency signal $\phi1$ will be present on a conductor 60 while during the time period T2 the low frequency signal $\phi2$ will be present on the same conductor. In a similar manner, the column conductor 61 is supplied with the low frequency signals $\phi1$ and $\phi2$. In this case, a NAND gate 70 is furnished with the timing signal T1 and the low frequency signal $\phi2$. A second NAND gate 72 is furnished with a timing signal T2 and the low frequency signal $\phi1$. The output of the NAND gates 70 and 72 are processed through a third NAND gate 74 whose output in turn is connected to a driver 76 which furnishes the signal for the column conductor 61.

It should be quite apparent that the signals presented to the column conductors 60 and 61 are not capable of fully determining the states of any of the cells since these are only the low frequency signals $\phi1$ and $\phi2$ and the presence of the high frequency signal is necessary to erase any of the cells in the matrix 44. The high frequency signals are actually furnished through the row conductors 58 and 59 as well as the necessary low frequency signals to allow addressing of a selected one of the cells. The output of the switch 52 is connected to a flip-flop 78 which has the normal two output conductors 80 and 81 on which the two possible output states of the flip-flop 78 are carried. The setting of the switch 52 in the erase or E mode or the write or W mode will determine which of the outputs 80 or 81 of the flip-flop 78 are activated. The output conductor 80 is connected to one input terminal of a NAND gate 84. The output conductor 81 is connected to an input terminal of a second NAND gate 85. The NAND gates 84 and 85, under the control of the output of the flip-flop 78, will determine whether the high frequency signal or one of the low frequency signals will be passed to the row conductor 58. Connected to another input terminal of the first NAND gate 84 is the high frequency signal designated as HF. Also connected to an input terminal of this NAND gate 84 is the time signal designated as T1. The NAND gate 85 has connected to one of its input terminals the low frequency signal designated as $\phi2$. The time signal T1 is also connected to a third input terminal of this NAND gate 85. When it is desired to maintain the cell A1 "off" or in the erased mode, the conductor 80 will carry an appropriate signal to the NAND gate 84 such that the NAND gate 84 will pass the high frequency signal HF along an output conductor 86 during the time that the time signal T1 is present. Because of the inversion properties of NAND gates, an output NAND gate 88 is provided to invert the signals into their proper voltage signs for operation. The conductor 86 is connected to this output NAND gate 88. The output NAND gate 88 is used to control all of the signals which are passed into the row conductor 58. The output of the output NAND gate 88 is connected to a driver 90 which in turn provides an operating signal of about 20 volts peak along a conductor 91 to the row conductor 58. In a similar manner, the switch 53 controls the operation of a flip-flop 92. The flip-flop 92 has two output conductors 94 and 95. The output conductor 94 is connected to one input of a NAND gate 96, while the output conductor 95 is connected to one input terminal of a NAND gate 98. The NAND gate 96 also has presented to its input terminals the high frequency signal HF and the time signal T2. The NAND gate 98 has connected to its input terminals in addition to the conductor 95, the low frequency signal $\phi2$ and the time signal T2. As was the case with the switch 52 controlling the cell A1, the switch 53 controls the operation of the cell A2 in a basically identical manner. It is important to note the inter-relationship of the inputs to the column conductors 60 and 61 as versus the inputs to the various NAND gates 84, 85, 96 and 98 which control the signals that are passed to the row conductor 58. Note that should it be desired to write or address the cell A1, the signal $\phi2$ would be passed along the conductor 58 at the time T1. Noting the input to the NAND gate 62 at time T1, the input thereto is the voltage signal $\phi1$. This then means that low frequency signal $\phi1$ is present on column conductor 60 simultaneously with the presence of low frequency signal $\phi2$ on row conductor 58. This then presents a potential difference across the cell A1 of about 40 volts peak to peak and will cause the cell A1 to assume a relatively darker configuration with respect to the background. This logic may be easily applied to all of the cells and should be quite evident from the description of the connections to the various gates which control these functions. The NAND gate 96 has an output along a conductor 100 which is connected to the output NAND gate 88. Similarly, the NAND gate 98 has an output conductor 102 which is also connected to the output NAND gate 88. Thus, the switch 52 will supply signals to the conductor 58 during the time of the time signal T1 while the switch 53 will allow supplying such signals during the time T2. Note that in the examples shown the switches 52 and 53 are both set on the E or erase terminals so that during the times T1 and T2 the high frequency signal will be supplied to the row conductor 58. This means that regardless of whatever low frequency signal $\phi1$ or $\phi2$ that may be presented along the column conductors 60 and 61, the high frequency signal will dominate during all times and the cells A1 and A2 will remain off.

The input to the row conductor 59 is controlled by the switches 54 and 55. The switch 54 controls the operation of a flip-flop 104. The flip-flop 104 has two output conductors 106 and 107. The output conductor 106 is connected to a NAND gate 108 while the output conductor 107 is connected to a NAND gate 110. Also connected to inputs of the NAND gate 108 are the high frequency signal HF and the time signal T1. The NAND gate 110 also has connected to its input the low frequency signal $\phi2$ and the time signal T1. The output of the NAND gate 108 is carried along a conductor 112 and to an output NAND gate 114 which serves a purpose identical to that previously described with respect to the output NAND gate 88. The output NAND gate 114 is connected to a driver 116 which presents a signal of about 20 volts peak along a conductor 117 to the row conductor 59. The output of the NAND gate 110 is carried along a conductor 118 which is connected to another input of the output NAND gate 114. The switch 55 controls a flip-flop 120 which has output conductors 122 and 123. The output conductor 122 is connected to one input of a NAND gate 124. The conductor 123 is connected to an input of another NAND gate 126. The NAND gate 124 also has presented as inputs to it the high frequency signal HF and the time signal T2. The NAND gate 126 has presented as additional input signals to it the low frequency signal $\phi2$ and the time signal T2. The output of the NAND gate 124 is carried along a conductor 128 to the output NAND gate 114 and the output of the NAND gate 126 is carried along a conductor 130 also to an input of the output NAND gate 114. In the example seen in FIG. 7 in the switch 54 is set to be in the W or write mode so that the cell B1 will be activated. Setting the switch 54 in the W mode allows a signal to be carried along the conductor 107 from the flip-flop 104 to activate the NAND gate 110. Therefore, during the time period T1 the low frequency signal $\phi2$ will be passed along the conductor 118 through the NAND gate 114 and the driver 116 and into the row conductor 59. Note that by virtue of the matrix type wiring system the cell B2 will also see the low frequency signal $\phi2$ at this time T1. However, during time T1 the NAND gate 62 will allow passing of the voltage low frequency signal $\phi1$ along the column conductor 60. This means that the potential difference across the cell B1 will be maximum since as was previously noted the low frequency signals $\phi1$ and $\phi2$ are set to be 180° out of phase. During the same time period T1 the NAND gate 70 will pass the low frequency signal $\phi2$ along the column conductor 61. The effect of this is that the cell B2 sees the same signal, namely the low frequency signal $\phi2$ at the same time, meaning that there is no net voltage difference across the cell B2 and it will not change states. Consider now the situation which occurs during the time period T2. The switch 55 actually controls the signal which is passed during the time period T2. Since the switch 55 is set in the erase or E mode, the NAND gate 124 is activated and the high frequency signal will be passed along the row conductor 59 during the time period T2. Also during time period T2 the NAND gate 64 will present the low frequency signal $\phi2$ along the column input conductor 60. The net result will be that the cell B1 will see a high frequency signal and a low frequency signal, but because of the switching rate and the response time of the cells, the cell B1 will not change state during the time period T2. The CLV material has the characteristic of reacting quickly to low frequency signals, but changing state rather slowly when exposed to high frequency signals. The cell B2 will also see the high frequency signal during time T2 and will be presented with the low frequency signal $\phi1$ during time T2. Since the cell B2 was previously off, it will remain off as a result of the high frequency signal being presented to it. Note again that during time period T1 the cell B2 is maintained in an off or unaddressed state by virtue of the fact that there is no potential difference across its terminals since the same voltage signal $\phi2$ is presented to both terminals, thus meaning there is no net potential difference available to change the state of the cell B2 during the time period T1.

It might be noted that the configuration shown of two NAND gates feeding a third NAND gate is logically identical to a situation in which two AND gates feed a single OR gate. In addition, the classic seven segment digital display, well known in the art, is a special case of a matrix which may be multiplex addressed by the method of this invention. Such a display is basically a 7 × 1 matrix. A display of N such digits would be 7 × N matrix. In describing the connections to a general matrix of dimensions M × N, M would generally define the rows and N the columns. Thus, there would be M row input conductors if all the sites in one row were connected in series. Similarly, there would be N column input conductors if all the sites in one column were connected in series. This is the most straight forward wiring technique; however, diagonal or other wiring configurations could also be used. All that is really required is that each M row input conductor be connected to only one site in each of the N column, and that each N column input conductor be connected to only one site in each of the M rows.

Figure 8:
FIG. 8 is a voltage vs. time chart of the high frequency electrical signal used for addressing in the present invention.
Figure 9:
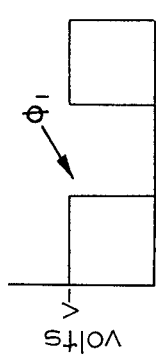
FIG. 9 is a voltage vs. time chart of one low frequency electrical signal used for addressing in the present invention.
Figure 10:
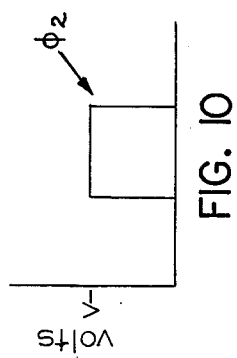
FIG. 10 is a voltage vs. time chart of a second low frequency electrical signal used for addressing in the present invention.

FIGS. 8, 9 and 10 illustrate the high frequency wave form HF and the low frequency wave forms $\phi1$ and $\phi2$. When the wave forms $\phi1$ and $\phi2$ are subtracted, the result is obviously a square wave having a peak value of V. When the wave form $\phi1$ and $\phi1$ or $\phi2$ and $\phi2$ are subtracted, the resultant is zero. Subtracting the HF signal from either $\phi1$ or $\phi2$ simply results in the HF waveform modulated by $\phi1$ or $\phi2$. The resultant wave form is a square wave having a peak value of V. These functions are important because the response of the CLV materials is a function of the square of the RMS voltage. Thus the 2V (RMS) signal level resulting from a combination of $\phi1$ and $\phi2$ has four times more effect on the CLV material than does the V (RMS) signal level of the HF signal.

There are several different addressing modes possible with the two level CLV material of FIG. 1 and the three level CLV material of FIG. 2. For the purpose of illustrating these modes, consider that cell or site A1 of a four cell or site CLV matrix is to be addressed. The HF, $\phi1$, $\phi2$, T1 and T2 terms have the same meanings as previously assigned.

Consider first the closed cell, light background type of matrix using a two level CLV material. The following Tables 1 and 2 illustrate the addressing of this matrix in a two time period scan.

TABLE 1

| T1 | | | | | | | |
|---|---|---|---|---|---|---|---|
| A1 | $\phi2$ | – | $\phi1$ | $\phi2$ | – | $\phi2$ | A2 |
| B1 | HF | – | $\phi1$ | HF | – | $\phi2$ | B2 |

TABLE 2

| T2 | | | | | | | |
|---|---|---|---|---|---|---|---|
| A1 | HF | – | $\phi2$ | HF | – | $\phi1$ | A2 |
| B1 | HF | – | $\phi2$ | HF | – | $\phi1$ | B2 |

During time T1, the cell A1 will see a potential difference of 2V at low frequency which will cause this cell to be dark. Cells B1 and B2 will see the HF signal which will force them to be transparent. Cell A2 will see no net potential difference at all, and so will tend to remain in its prior state. During time T2, the cell A1 will see the HF signal which will tend to turn it transparent. However, since the time required to turn a cell transparent is greater than the time required to turn the same cell dark, the time T2 is chosen to end before the cell A1 can become transparent. Then, when T1 occurs again, the cell will be forced dark once again. During time T2 cells A2, B1, and B2 all see the HF signal also. Since B1 and B2 saw the same signal during time T1, they will remain transparent. Cell A2 will be forced toward a transparent state since it sees no net voltage during time T1. A few cycles of times T1 and T2 may be required to force A2 into a stable, transparent state, but since the cycle rate is quite rapid, this presents no problem. In part, human persistence of vision tends to blank out the minor changes occurring in the light levels of cells A1 and A2.

Figure 11:
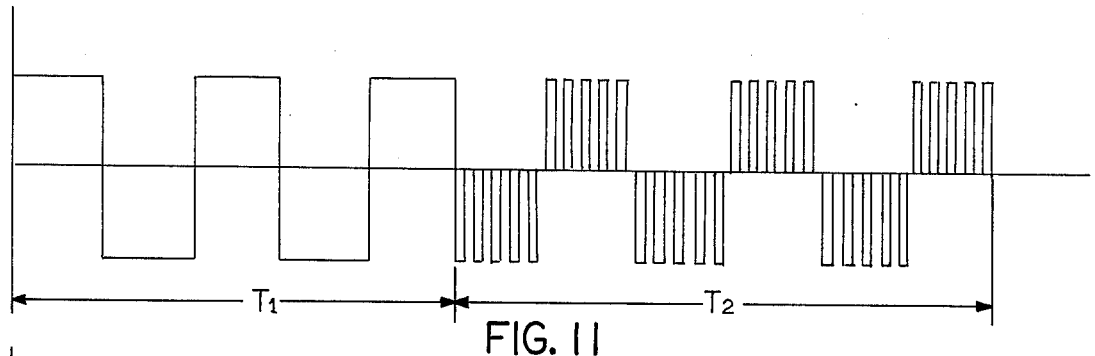
FIG. 11 is a voltage vs. time chart of the signals seen by one matrix site in a 2 × 2 matrix during two time periods.
Figure 12:
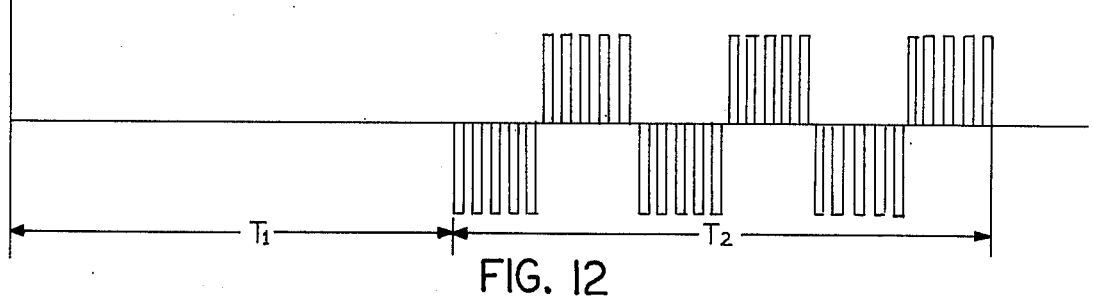
FIG. 12 is a voltage vs. time chart of the signals seen by a second matrix site in the same 2 × 2 matrix during the same two time periods as in FIG. 11.
Figure 13:
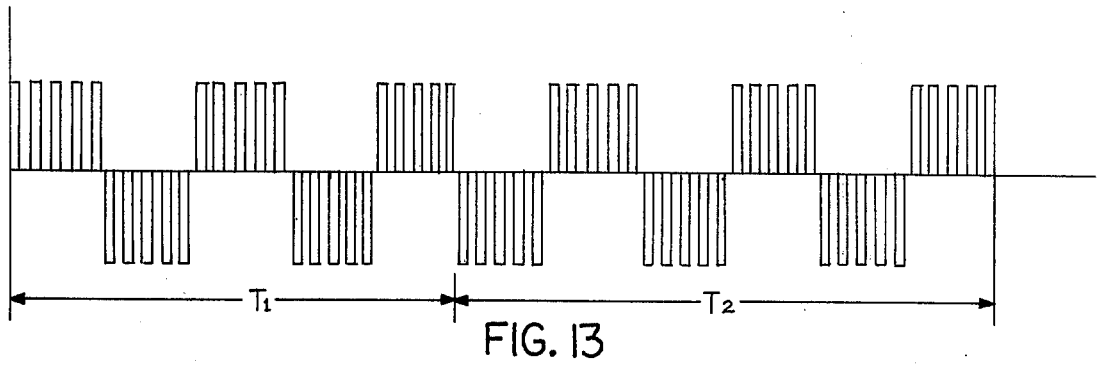
FIG. 13 is a voltage vs. time chart of the signals seen by a third matrix site in the same 2 × 2 matrix during the same two time periods as in FIG. 11.
Figure 14:
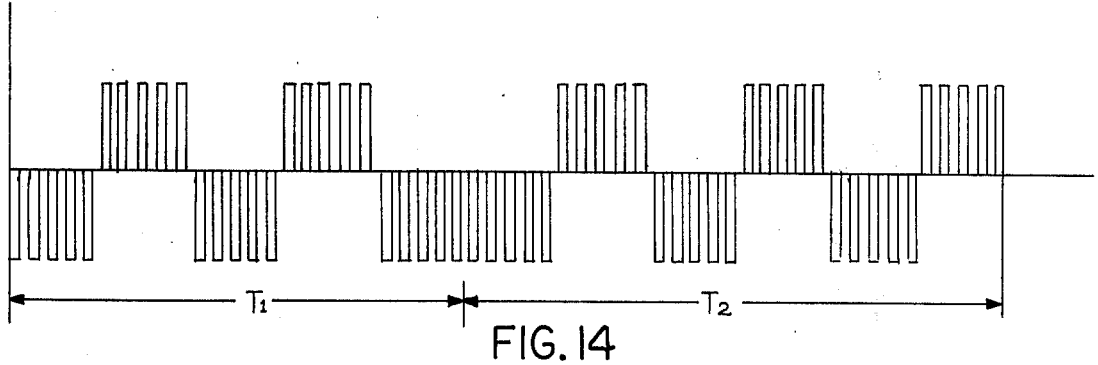
FIG. 14 is a voltage vs. time chart of the signals seen by a fourth matrix site in the same 2 × 2 matrix during the same two time periods as in FIG. 11.

FIG. 11 shows the signal to cell A1 during times T1 and T2. FIG. 12 shows the signal to cell A2 during times T1 and T2. FIG. 13 shows the signal to cell B1 during times T1 and T2. FIG. 14 shows the signal to cell B2 during times T1 and T2. FIGS. 11–14 are a graphic illustration of the conditions shown in Tables 1 and 2.

A second mode utilizes an open cell matrix using a two level CLV material. This type of cell does not require a light background for viewing because the site addressed will be lighter than the background in this case. In the previous case, if the background were not made light and an open cell were used, considering a typical seven segment numerical display, the actual display that would be seen would be the compliment of the number desired. That is, the unaddressed segments would appear light and the addressed segments could be dark. Since the CLV material itself is dark, the non-addressed segments would stand out against a dark background. Thus, the background of the cells should be made light so that those segments that are not addressed would blend in with the background, allowing the addressed segments to stand out. This second mode may be considered the compliment of the first mode in that all of those cells that are not carrying information are addressed with the low frequency signal to keep them dark. Tables 3 and 4 illustrate this addressing mode.

TABLE 3

| | | | T1 | | | | |
|---|---|---|---|---|---|---|---|
| A1 | HF | – | $\phi$1 | HF | – | $\phi$2 | A2 |
| B1 | $\phi$2 | – | $\phi$1 | $\phi$2 | – | $\phi$2 | B2 |

TABLE 4

| | | | T2 | | | | |
|---|---|---|---|---|---|---|---|
| A1 | $\phi$2 | – | $\phi$2 | $\phi$2 | – | $\phi$1 | A2 |
| B1 | $\phi$2 | – | $\phi$2 | $\phi$2 | – | $\phi$1 | B2 |

During time T1, site A1 is addressed by the HF signal which will tend to make A1 more light transmissive or tend toward transparency. Site A2 is similarly addressed which would seem to also force it toward transparency. Site B1 receives low frequency signals $\phi$2 and $\phi$1, which gives the 2V potential difference forcing this site to be dark. Site B2 sees no net potential difference and will therefore tend to retain the state in which it was set during time T2.

During time T2, site A1 sees no net potential difference. Thus, over a period of a few cycles, the site A1 will become unambiguously transparent as a result of the signal impressed during time T1. Site A2 sees a net 2V potential difference during time T2. Thus, due to the difference in response times of turning dark (which is faster) as versus turning transparent, the T2 condition will dominate and site A2 will be dark. Site B1 will see no potential difference and will remain dark as was set during time T1. Site B2 will see a 2V low frequency potential difference and will therefore be dark. This dark state will remain during time T1 since this site sees no potential difference during time T1.

A third mode of operation utilizes a three level CLV material in an open cell matrix configuration. The logic tables at times T1 and T2 for this mode are identical to Tables 1 and 2. Under the conditions of this particular operational mode, site A1 will carry information by being forced to be darker than the surrounding material as a result of the 2V potential difference applied during time T1. The basic reasoning is identical to that fully explained for the first described mode and reference is made thereto. Note that the three level material can operate in this mode in an open cell configuration, while the two level material must use a closed cell configuration when operated in the identical mode. This is because the dark level, controlled by the low frequency signals, is darker than the background of the CLV material in the three level material, but equal to the background darkness level in the two level material.

A fourth mode of operation also utilizes a three level CLV material in an open cell matrix configuration. In this case, the logic tables for times T1 and T2 are identical to Tables 3 and 4. This case allows presentation of an addressed site as a light area against a dark background. The logic of operation is identical to that described with respect to the second mode of operation and reference is made to the detailed explanation of this mode. The reason for choosing the fourth mode over the second mode would generally be for reasons of contrast level. Since the three level CLV material has a dark level, when excited by a low frequency signal, which is darker than the unexcited or normal level, the contrast between the light and dark sites is greater than that possible for the two level material.

A fifth mode of operation may utilize either the two level or the three level CLV material. In this case, a closed cell structure is utilized. The spaces between cells are colored dark so that the cells in their normal state will blend with the background. The addressing scheme for times T1 and T2 is that shown in Tables 3 and 4. Thus, an addressed site, or cell in this case, will appear light against a dark background. The background is determined by both those cells which are held dark and by the dark colored spaces between cells.

A sixth mode of operation may also utilize either the two level or the three level CLV material. This sixth mode of operation contemplates an open cell type structure. In this case, the area around the individual sites is colored white or a light color. This coloring would preferably be applied to the under side of the top plate in the open cell configuration. The addressing scheme employed in this mode for times T1 and T2 is identical to that shown in Tables 1 and 2. In this case, an addressed site will appear dark against a light background.

It should be clear that what has been presented is a technique or method for operating a matrix of general dimension M × N for a series of combinations of the two level and three level CLV materials which are frequency responsive. A selected site, keeping in mind that the general term site may also include individual, isolated cells, such as one designated as $M_iN_j$ may be multiplex addressed. The addressing technique requires that the site be furnished a low frequency electrical signal and a high frequency electrical signal during one time period and two low frequency electrical signals during another time period. The six operating modes described clearly show various combinations of these signals to produce a desired result. Whether the addressed site is forced to be light or dark, the non-selected or non-addressed sites are then furnished with a combination of low frequency and high frequency electrical signals during both time periods that will force these sites to assume a state complimentary to that of the selected or addressed site. If the addressed site is dark, then the compliment of this state is light. If the addressed site is light, the compliment must be dark.

The following procedures illustrate the preparation and testing of frequency responsive herapathite suspensions. In these procedures all parts and parts by weight, and all percentages are weight percentages and the steps are accomplished at room temperature unless indicated otherwise.

EXAMPLE 1

Part A

A quinine bisulfate solution is prepared by dissolving quinine bisulfate heptahydrate (1.90 grams) in methanol (5.0 grams).

Part B

Twenty-four grams (24.0) of a solution of 29% nitrocellulose in ethoxyethanol is charged to a reaction vessel equipped with a stirrer. Five grams (5.0) of tricresylphosphate are added to the nitrocellulose solution and the resulting mixture is stirred for several minutes until a homogeneous solution is formed.

Part C

The quinine bisulfate solution of Part A is added to the solution of Part B and stirring is continued for several minutes until a clear, viscous solution is obtained.

Part D

A solution of iodine (0.9 grams) and sodium iodide (0.3g) is prepared by dissolving the sodium iodide in water (0.5g), adding the iodine, and then n-propanol (5.0g). After the iodine dissolves, dioctylphthlate (15g) is added. The resulting solution is added to the solution of Part C with vigorous stirring and a smooth, very dark, thick paste is quickly formed.

The paste is spread out as a thin layer (about 10–15 mils) on a glass plate with a doctor blade and allowed to dry at 25° C and approximately 40% relative humidity for two hours.

The molar excess of added water (introduced in the NaI solution) to the theoretical amount of herapathite is 32 to 1.0. The dried paste is then suspended in approximately 6 times its weight of a solvent mixture comprising 23% isoamyl acetate and 77% di-isopropyl adipate. The suspension is accomplished by vigorous agitation in an ultrasonic mixing chamber for about 16 hours.

The resulting herapathite suspension is dark in appearance and is quite stable against settling. The herapathite crystals are in the form of flakes or platelets having length and width dimensions of about 0.5 to 1.5 microns and a thickness of about 0.02 to 0.04 microns as determined by electron microscopy.

Part E

The suspension from Part D is placed in a test cell to determine the optical transmission as a function of frequency of the applied voltage. The cell comprises a small, transparent, "sandwich structured" glass chamber formed by sealing glass plates on opposite sides of a spacer gasket of a thickness of 5 mils. The glass plates have transparent conductive coatings of tin oxide on the inside surfaces thereof (e.g. NESA type glass sold by PPG) so as to contact the suspension in the cell. The surface resistance of the coating is about 80 ohms/square. These conductive coatings are connected to an electrical power supply which is capable of generating an alternating electrical field with variable amplitude, frequency, and wave form.

In these test procedures the term "absorbance" is used in its conventional sense as defined by the text entitled "The Science of Color — Committee on Colorimetry," Optical Society of America, published by Thomas Crowell Co. (1953) pp. 181 and 182. In the examples that follow, absorbance is determined from the formula:

$$A = \log_{10} I_o/I$$

Where $I$ is the transmisson through a cell containing a suspension of absorbing material and $I_o$ is the transmission through a cell containing the suspending fluid only (i.e. the absorbing particles are absent);

$I'$ is defined as the intensity of the light source and $I_o = fI'$ where $f$ is the fraction of light transmitted by the cell and suspending fluid only and is empirically determined to be about 0.8.

Thus $$A = \log (f) I'/I$$

$A$ is equivalent to Optical Density + $\log f$. The absorbance change $\Delta A$ is defined as $$A = A_E - A_{E=0}$$

where $A_{E=0}$ is the absorbance at zero applied field and $A_E$ is the absorbance at applied field E which is applied across the cell in a direction parallel to the light beam passing through the cell. According to the above equation, $\Delta A$ will be negative for suspensions which lighten or become more transmissive upon application of a field and positive for suspensions which darken or become less transmissive.

Since $$A_E = \log_{10} f I'/I_E$$

and $$A_{E=0} = \log_{10} f I'/I_{E=0}$$

then $$\Delta A = \log_{10} I_{E=0}/I_E$$

or $$-\Delta A = \log_{10} I_E/I_{E=0}$$

The absorbance, $A_{E=0}$, is determined by measuring the Optical Density and using $A_{E=0} = OD + \log f$.

The absorbance change ($\Delta A$) is obtained interposing the test cell between a beam of monochromatic light at 6,000 angstroms and photocell detector optically aligned to intercept the light beam passing through the test cell. The output of the photocell detector is a function of $I$. Using a log converter the photo cell output is converted to read $-\Delta A$ directly.

In the test procedure the wave form is a square wave at the voltage amplitude and frequency indicated.

The cell is filled with the herapathite suspension prepared in Part E and placed in the photocell detector.

Figure 15:
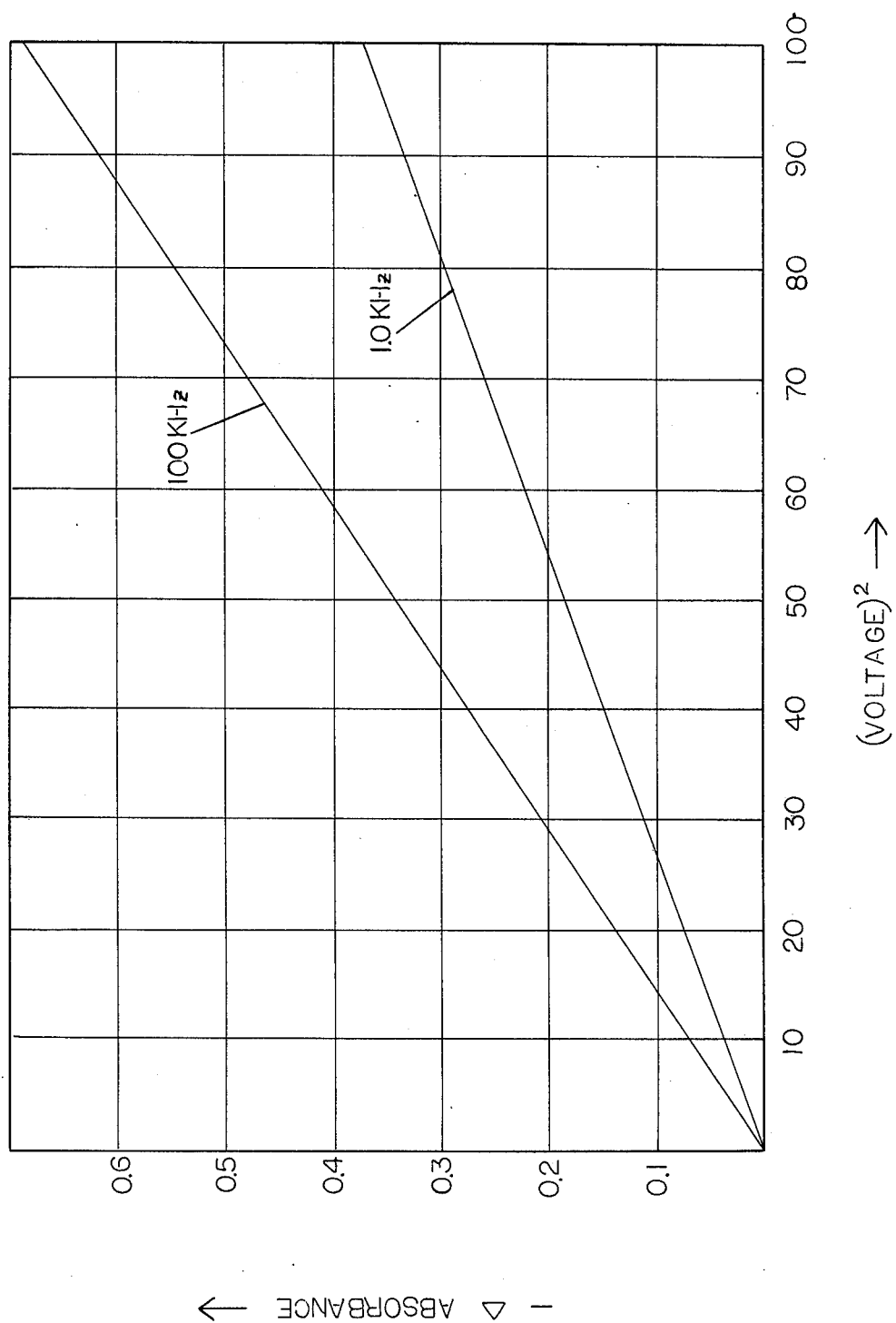
FIG. 15 is a plot of voltage squared vs. absorbance change for two frequencies of applied signal for the two level type CLV material.

Sufficient square wave voltage at a constant frequency of 1.0 kHz is applied to the cell in stepwise fashion so that the potential across the cell increases at 1 volt (RMS) increments. The absorbance change ($\Delta A$) is recorded at each voltage increment. A similar test is performed at 100 kHz. The resulting data is set forth in Table 5. FIG. 15 is a plot of change in absorbance, $\Delta A$, as a function of the square of the applied voltage. (At voltages well below saturation the absorbance change is known to be proportional to the square of the field). (See the article entitled, "Colloid Electro-optics Electrically Induced Phenomena in Disperse Systems" by S. P. Stoylov, Advances in Colloid and Interface Science 3, (1971) pp. 45-110).

The data in Table 5 and FIG. 15 indicates that the change in absorbance at any given value of Voltage$^2$ is greater for a frequency of 100 kHz than 1 kHz, but all "$\Delta A$"s noted are negative in sign which indicates that the suspension becomes more transmissive or "lighter" at either frequency when compared to the transmission in the absence of an applied field.

Part F

To further demonstrate the transmission characteristics as a function of frequency of the applied voltage for the herapathite suspension, the following tests are conducted.

Figure 16:
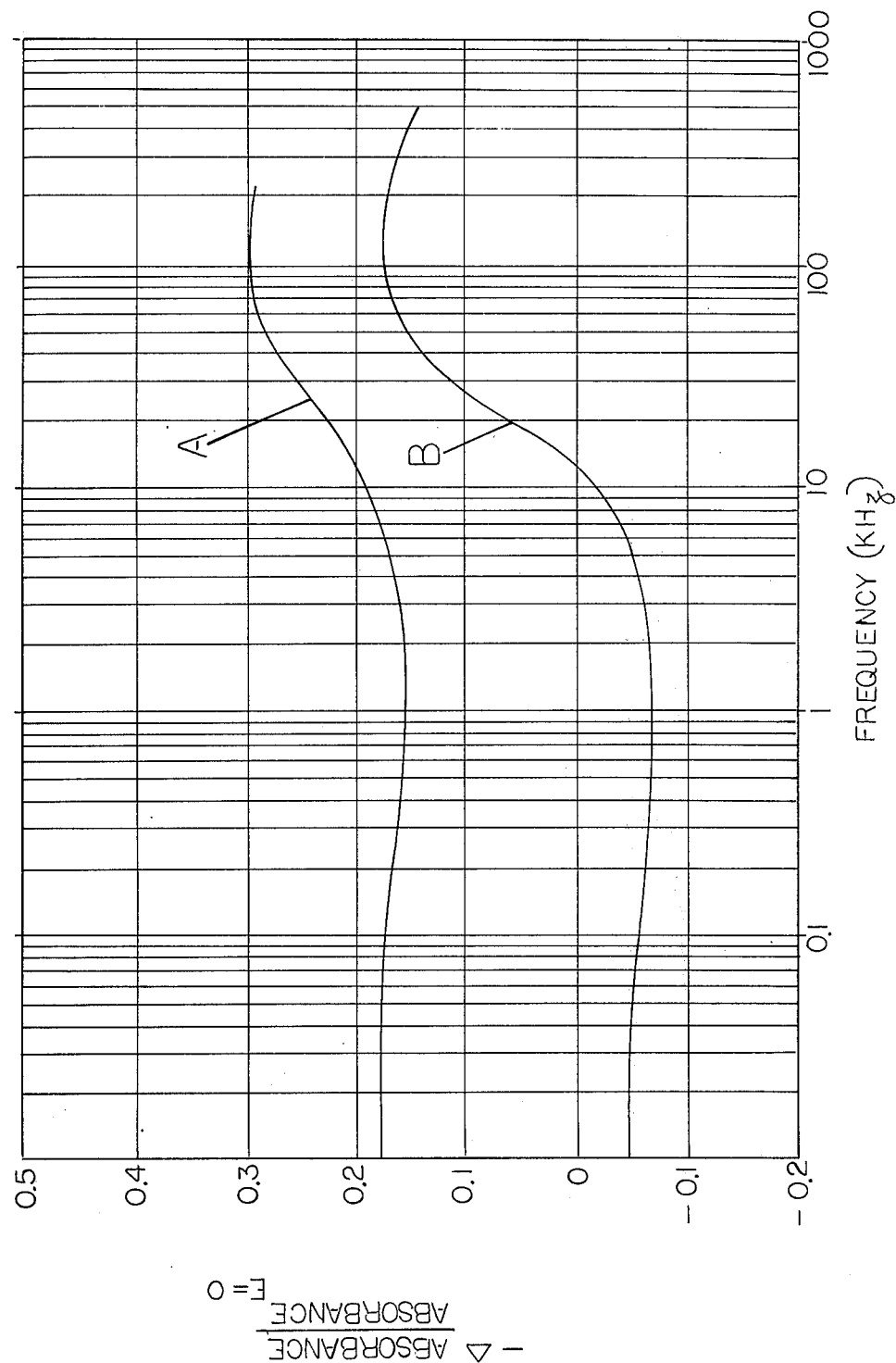
FIG. 16 is a plot of the log of frequency vs.

A test cell like the one used in Part E is filled with the herapathite suspension prepared in Part D. The cell is placed in the photocell test chamber as described above and $A_{E=0}$ of the herapathite suspension is measured to be 2.08. At a frequency of 10 Hz in Table 6, 10 volts is applied and the value of $\Delta A/A_{E=0}$ is measured. This procedure is repeated at frequency increments indicated in Table 6 below and $$-\left(\frac{\Delta A}{A_{E=0}}\right) 10 \text{ volts}$$

is obtained as a function of the frequency of the applied voltage. This data is set forth in Table 6. FIG. 16, curve A, is a plot of $$-\left(\frac{\Delta A}{A_{E=0}}\right) 10 \text{ volts}$$

as a logarithmic function of frequency. This plot shows that the suspension becomes more transmissive or lighter with increasing frequency above about 10 kHz.

EXAMPLE 2

The procedures of Parts A through D of Example 1 are repeated except that 1.5 grams of water is used in the sodium iodide, iodine, n-propanol solution of Part D. This provides a molar excess of added water to theoretical herapathite of 96 to 1.0. The resulting herapathite crystals have similar appearance and crystalline size and shape as in Example 1 and a suspension prepared from them has an $A_{E=0}$ of 1.89.

The procedure of Part E of Example 1 are repeated and the results are reported in Table 7.

The data from Table 7 is plotted (FIG. 17) as in Example 1 and it is readily apparent that the suspension becomes less transmissive or darker as the voltage increases at a constant frequency of 1 kHz while this suspension becomes more transmissive or lighter as the voltage increases at a constant frequency of 300 kHz.

To further illustrate this characteristic, the procedures of Part F of Example 1 are repeated for a herapathite suspension prepared as in Part A of this Example which has an $A_{E=0}$ of 1.889. Measurements are made at a constant cell site potential of 5 volts. The results are reported in Table 8. This data is plotted in FIG. 16, curve B, and it can be seen that as the frequency increases the suspension becomes darker at frequencies between 10 and 13,000 Hz and then becomes lighter at frequencies above 13,000 Hz.

The absorbance ratio is defined as $$-\Delta A/A_{E=0}$$

The absorbance ratio has the advantage of being roughly independent of particle concentration and the cell spacing and would be completely independent for suspensions which obey Beer's Law, (assuming that the electro-optical phenomenon is also independent of concentration).

TABLE 5

| Voltage | (Voltage)$^2$ | Change in absorbance-($\Delta A$) at 1.0 kHz | 100 kHz |
|---|---|---|---|
| 1 | 1 | 0.003 | 0.005 |
| 2 | 4 | 0.015 | 0.023 |
| 3 | 9 | 0.036 | 0.057 |
| 4 | 16 | 0.064 | 0.106 |
| 5 | 25 | 0.098 | 0.170 |
| 6 | 36 | 0.136 | 0.248 |
| 7 | 49 | 0.177 | 0.335 |
| 8 | 64 | 0.219 | 0.426 |
| 9 | 81 | 0.261 | 0.519 |
| 10 | 100 | 0.303 | 0.609 |

Table 6

| Frequency (Hz) | $-\left(\frac{\Delta A}{A_{E=0}}\right)$ 10 Volts |
|---|---|
| 10 | 0.179 |
| 100 | 0.177 |
| 200 | 0.169 |
| 300 | 0.162 |
| 400 | 0.159 |
| 500 | 0.157 |
| 750 | 0.153 |
| 1000 | 0.150 |
| 2000 | 0.152 |
| 3000 | 0.157 |
| 4000 | 0.162 |
| 5000 | 0.167 |
| 10,000 | 0.189 |
| 20,000 | 0.229 |
| 30,000 | 0.256 |
| 40,000 | 0.273 |
| 50,000 | 0.282 |
| 100,000 | 0.295 |
| 200,000 | 0.295 |
| 300,000 | 0.294 |

TABLE 7

| Voltage | (Voltage)$^2$ | Change in absorbance-($\Delta A$) at 1 kHz | 300 kHz |
|---|---|---|---|
| 1 | 1 | −0.001 | 0.007 |
| 2 | 4 | −0.011 | 0.034 |
| 3 | 9 | −0.038 | 0.084 |
| 4 | 16 | −0.079 | 0.154 |
| 5 | 25 | −0.123 | 0.244 |
| 6 | 36 | −0.165 | 0.347 |
| 7 | 49 | −0.200 | 0.455 |
| 8 | 64 | −0.226 | 0.562 |
| 9 | 91 | −0.244 | 0.663 |
| 10 | 100 | −0.245 | 0.753 |

TABLE 8

| Frequency (Hz) | $-\left(\frac{\Delta A}{A_{E=0}}\right)$ 10 volts |
|---|---|
| 10 | −0.042 |
| 20 | −0.045 |
| 30 | −0.048 |
| 40 | −0.050 |
| 50 | −0.051 |
| 100 | −0.056 |
| 200 | −0.061 |
| 300 | −0.063 |
| 400 | −0.064 |
| 500 | −0.065 |
| 1000 | −0.065 |
| 2000 | −0.062 |
| 3000 | −0.056 |
| 4000 | −0.050 |
| 5000 | −0.044 |
| 10,000 | −0.014 |
| 20,000 | +0.021 |
| 30,000 | +0.047 |
| 40,000 | +0.068 |
| 50,000 | +0.084 |
| 100,000 | +0.106 |
| 200,000 | +0.144 |
| 300,000 | +0.127 |
| 400,000 | +0.127 |
| 500,000 | +0.129 |

What we claim is:

1. A method for operating a matrix of dimensions M×N, of a colloidal light valve material which is frequency responsive to exhibit greater light transmission in response to high frequency electrical signals than to low frequency electrical signals which comprises the steps of:
   a. defining a matrix of a plurality of unique sites of dimensions M×N of said colloidal light valve material;
   b. connecting each matrix site in each M row in series to a single input electrical conductor to thereby give a total of M row input conductors;
   c. connecting each matrix site in each N column in series to a single input electrical conductor to thereby give a total of N column input conductors; and
   d. multiplex addressing any selected $M_i$, $N_j$ one of said matrix sites by the steps of:
      i. individually supplying an individual $M_i$ row or $N_j$ column electrical conductor with a high frequency electrical signal and supplying the other of said $M_i$ row and $N_j$ column intersecting electrical conductors with a low frequency electrical signal during one time period and supplying both the $M_i$ row and the $N_j$ column electrical conductors with a low frequency electrical signal during another time period in a repeating cycle; and
      ii. supplying non-selected sites in said M×N matrix with combinations of high frequency and low frequency electrical signals during said two time periods to force the average light transmission of said non-selected sites to be the compliment of the average light transmission of said $M_i$, $N_j$ selected site.

2. The method of claim 1 wherein said matrix is defined by a plurality of closed, isolated cells defining said unique sites, wherein the back surface of said matrix is lighter than the area surrounding said cells, and wherein step (d) (i) comprises the steps of:
   supplying a first low frequency electrical signal to said $M_i$ row electrical conductor during said one time period;
   supplying a second low frequency electrical signal that is out of phase with said first, low frequency electrical signal to said $N_j$ column electrical conductor during said one time period;
   supplying said high frequency electrical signal to said $M_i$ row electrical conductor during said other time period; and
   supplying one of said low frequency electrical signals to said $N_j$ column electrical conductor during said other time period.

3. The method of claim 1 wherein said matrix is an open cell type structure with said sites being defined by the intersections of said row and column electrical conductors, and wherein step (d) (i) comprises the steps of:
   supplying said high frequency electrical signal to said $M_i$ row electrical conductor during said one time period;
   supplying a first low frequency electrical signal to said $N_j$ column electrical conductor during said one time period;
   supplying a second low frequency electrical signal to said $M_i$ row electrical conductor during said other time period; and
   supplying said second low frequency electrical signal to said $N_j$ column electrical conductor during said other time period to thereby generate a net zero potential across said site during said other time period.

4. The method of claim 1 wherein said matrix is an open cell type structure with said sites being defined by the intersections of said row and column electrical conductors, wherein said colloidal light valve material exhibits a light transmission level in response to said low frequency electrical signals that is less than its normal light transmission level when no electrical signal is applied, and wherein step (d) (i) comprises the steps of:
   supplying a first low frequency electrical signal to said $M_1$ row electrical conductor during said one time period;
   supplying a second low frequency electrical signal that is out of phase with said first, low frequency electrical signal to said $N_j$ column electrical conductor during said one time period;
   supplying said high frequency electrical signal to said $M_i$ row electrical conductor during said other time period; and
   supplying one of said low frequency electrical signals to said $N_j$ column electrical conductor during said other time period.

5. The method of claim 1 wherein said matrix is an open cell type structure with said sites being defined by the intersections of said row and column electrical conductors, wherein said colloidal light valve material exhibits a light transmission level in response to said low frequency electrical signals that is less than its normal light transmission level when no electrical signal is applied, and wherein step (d) (i) comprises the steps of:
   supplying said high frequency electrical signal to said $M_i$ row electrical conductor during said one time period;

supplying a first low frequency electrical signal to said $N_j$ column electrical conductor during said one time period;

supplying a second low frequency electrical signal to said $M_i$ row electrical conductor during said other time period; and supplying said second low frequency electrical signal to said $N_j$ column electrical conductor during said other time period to thereby generate a net zero potential across said site during said other time period.

6. The method of claim 1 wherein said matrix is defined by a plurality of closed, isolated cells defining said unique sites, wherein the area surrounding said cells is dark, and wherein step (d) (i) comprises the steps of:

supplying said high frequency electrical signal to said $M_i$ row electrical conductor during said one time period;

supplying a first low frequency electrical signal to said $N_j$ column electrical conductor during said one time period;

supplying a second low frequency electrical signal to said $M_i$ row electrical conductor during said other time period; and supplying said second low frequency electrical signal to said $N_j$ column electrical conductor during said other time period to thereby generate a net zero potential across said site during said other time period.

7. The method of claim 1 wherein said matrix is an open cell type structure with said sites being defined by the intersections of said row and column electrical conductors, wherein the areas surrounding said sites are colored light, and wherein step (d) (i) comprises the steps of:

supplying a first low frequency electrical signal to said $M_i$ row electrical conductor during said one time period;

supplying a second low frequency electrical signal that is out of phase with said first, low frequency electrical signal to said $N_j$ column electrical conductor during said one time period;

supplying said high frequency electrical signal to said $M_i$ row electrical conductor during said other time period; and supplying one of said low frequency electrical signals to said $N_j$ column electrical conductor during said other time period.

8. A system for the operation of a matrix of dimensions M×N of a colloidal light valve material which is frequency responsive to exhibit greater light transmission in response to high frequency electrical signals than to low frequency electrical signals, which comprises, in combination:

a matrix of dimensions M×N, made up of a plurality of unique sites of said colloidal light valve materials;

means for connecting one matrix site in each N column in series to a single input electrical conductor to thereby give a total of M row input conductors;

means for connecting one matrix site in each M row in series to a single input electrical conductor to thereby give a total of N column input conductors; and means for multiplex addressing any selected $M_i$, $N_j$ one of said matrix sites, said means including:

means for individually supplying an individual $M_i$ row or $N_j$ column electrical conductors with a high frequency electrical signal and supplying the other of said $M_i$ row and $N_j$ column intersecting electrical conductors with a low frequency electrical signal during one time period, and for supplying both the $M_i$ row and the $N_j$ column electrical conductors with a low frequency electrical signal during another time period in a repeating cycle; and means for supplying non-selected sites in said M×N matrix with combinations of high frequency and low frequency electrical signals during said two time periods to force the average light transmission of said non-selected sites to be compliment of the average light transmission of said $M_i$, $N_j$ selected site.

* * * * *